United States Patent [19]

O'Neal

[11] 4,262,458
[45] Apr. 21, 1981

[54] DEVICE FOR MOUNTING AN INFLATABLE DOCK SEAL

[76] Inventor: Larry O'Neal, 4953 Timbercrest Drive, Canfield, Ohio 44406

[21] Appl. No.: 17,595

[22] Filed: Mar. 5, 1979

[51] Int. Cl.³ .............................................. E04B 1/34
[52] U.S. Cl. ..................................... 52/2; 52/173 DS; 49/499
[58] Field of Search ................. 52/2, 173 DS; 49/499; 160/395, 399

[56] References Cited

U.S. PATENT DOCUMENTS

| | | | |
|---|---|---|---|
| 1,698,064 | 1/1929 | Otto | 160/395 |
| 2,914,776 | 12/1959 | Hotz | 160/395 |
| 3,059,657 | 10/1962 | Turner | 52/2 |
| 3,240,217 | 3/1966 | Bird | 52/2 |
| 3,355,851 | 12/1967 | Imbertson | 52/2 |
| 3,391,503 | 7/1968 | O'Neal | 52/2 |
| 4,020,607 | 5/1977 | Bjervig | 52/173 DS |
| 4,045,925 | 9/1977 | O'Neal | 52/173 DS |

FOREIGN PATENT DOCUMENTS 2712889 9/1978 Fed. Rep. of Germany ...... 52/173 DS
686440 3/1965 Italy .................................................. 52/2

Primary Examiner—Price C. Faw, Jr.
Assistant Examiner—Henry E. Raduazo
Attorney, Agent, or Firm—Webster B. Harpman

[57] ABSTRACT

An inflatable dock seal for closing the area around a dock opening in a wall with respect to a railway car or the like is secured to said wall by devices comprising uninflated tubular members attached to said inflatable dock seal and rigid structural members positioned in said uninflated tubular members so as to extend longitudinally of the sections of the inflatable dock seal. Clamps are affixed to the wall in which the dock opening is located and adjacent thereto and the uninflated tubular members with their rigid structural members are engaged by said clamps to secure the dock seal to the building about the dock opening therein.

2 Claims, 6 Drawing Figures

DEVICE FOR MOUNTING AN INFLATABLE DOCK SEAL

BACKGROUND OF THE INVENTION (1) Field of the Invention

This invention relates to inflatable dock seals and devices for mounting the same about a dock opening in the wall of a building with respect to a railway car positioned alongside the same.

(2) Description of the Prior Art

Prior structures of this type have been mounted on or in an opening in a building adjacent which a railway car or the like is to be positioned so as to seal the same with respect thereto.

In my earlier U.S. Pat. No. 3,303,615 I disclosed a donut-type of dock seal positioned for effecting a desirable closure and wherein the dock seal was secured to a frame of wood mounted about the dock opening.

In my prior U.S. Pat. Nos. 3,391,502 and 3,391,503 different forms of dock seals are disclosed and wherein the same are mounted about a dock opening through the use of wooden frame members or the like.

In my earlier U.S. Pat. No. 4,045,925 a wooden frame member is used to support the horizontal portion of the dock seal and elongated uninflated tubular members with rigid structural members therein are disclosed for mounting vertical sections of the dock seal.

In the present invention uninflated tubular members secured to the bottom and side sections of the inflatable dock seal so as to receive rigid members and are in turn held to the building wall by positioning the same in clamps which are secured to the wall.

The invention disclosed herein is easily and economically formed and quickly and easily mounted on a wall about a dock opening and enables portions of the inflatable dock seal to be repositioned or replaced by being quickly removable from the supporting building wall.

SUMMARY OF THE INVENTION

An inflatable dock seal comprises a continuously extending multiple walled inflatable member having horizontally spaced vertical side sections and vertically spaced top and bottom sections provided with uninflated tubular members secured to the vertical sections and the bottom horizontal section and arranged for engagement with the surface of the wall about the dock opening. Rigid structural members such as metal tubes are positioned in the uninflated tubular members and the structural members are clamped to the wall surface by a plurality of clamps positioned in spaced relation to one another on the wall surface and arranged to engage and detachably hold the structural members and the tubular members.

DESCRIPTION OF THE PREFERRED EMBODIMENT

Figure 1:
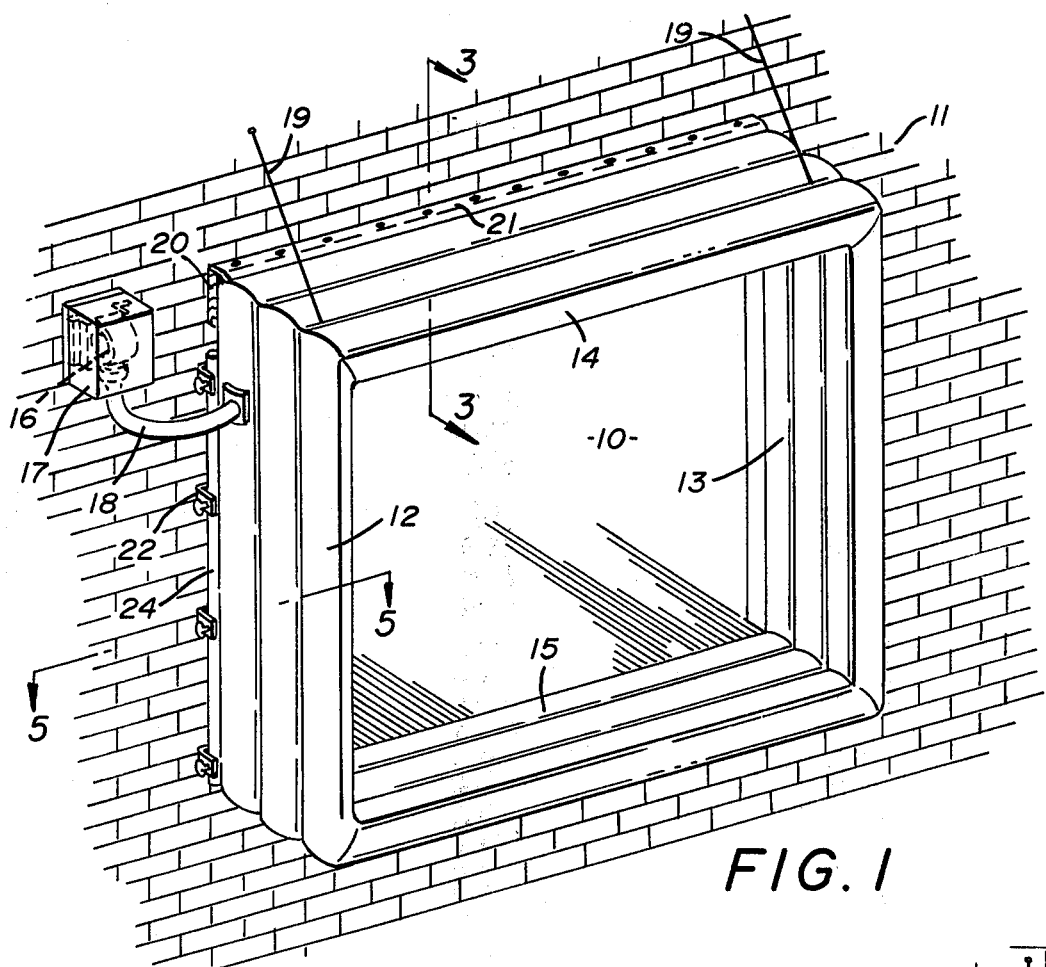
FIG. 1 is a perspective elevation of an inflatable dock seal and mounting devices on a wall about a dock opening.

By referring to the drawings and FIG. 1 in particular, it will be seen that a loading dock opening 10 is located in a building wall 11 and provided with a pair of vertical inflatable members 12 and 13 at the sides thereof together with a pair of horizontally disposed inflatable members 14 and 15 at the top and bottom respectively thereof. The ends of the inflatable members 12, 13, 14, and 15 are joined to one another to form an airtight flexible seal with respect to a railway car or the like positioned adjacent the dock opening 10. A blower 16 in a housing 17 is mounted on the wall 11 adjacent the dock seal and a tubular air duct 18 establishes communication between the blower and the inflatable dock seal so that the same can be inflated thereby. Supporting cords 19 extend from the wall 11 above the dock opening 10 to the upper portion of the horizontal section 14 of the inflatable dock seal. The dock seal and its upper portion adjacent the wall 11 is attached thereto by a wooden member 20 which is affixed to the surface of the wall 11 and the upper horizontal section 14 of the dock seal has a flap 21 thereon which is fastened to the upper surface of the wooden member 20. The side sections 12 and 13 and the bottom section 15 of the inflatable dock seal are detachably secured to the face of the wall 11 by devices comprising a plurality of clamps 22 and elongated structural members 23, the structural members 23 being disposed in uninflated tubular members 24 which are attached along the longitudinal edges of the side sections 12 and 13 of the inflatable dock seal and along the back surface of the horizontal section 15 thereof as best shown in FIG. 2 of the draings.

Figure 3:
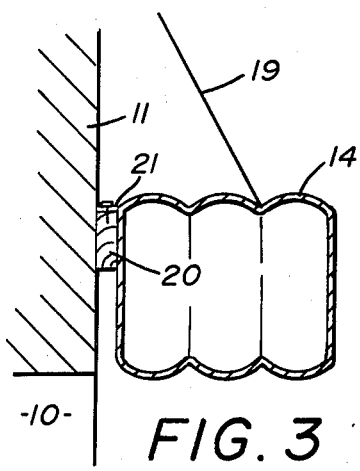
FIG. 3 is a vertical section on line 3—3 of FIG. 1.
Figure 2:
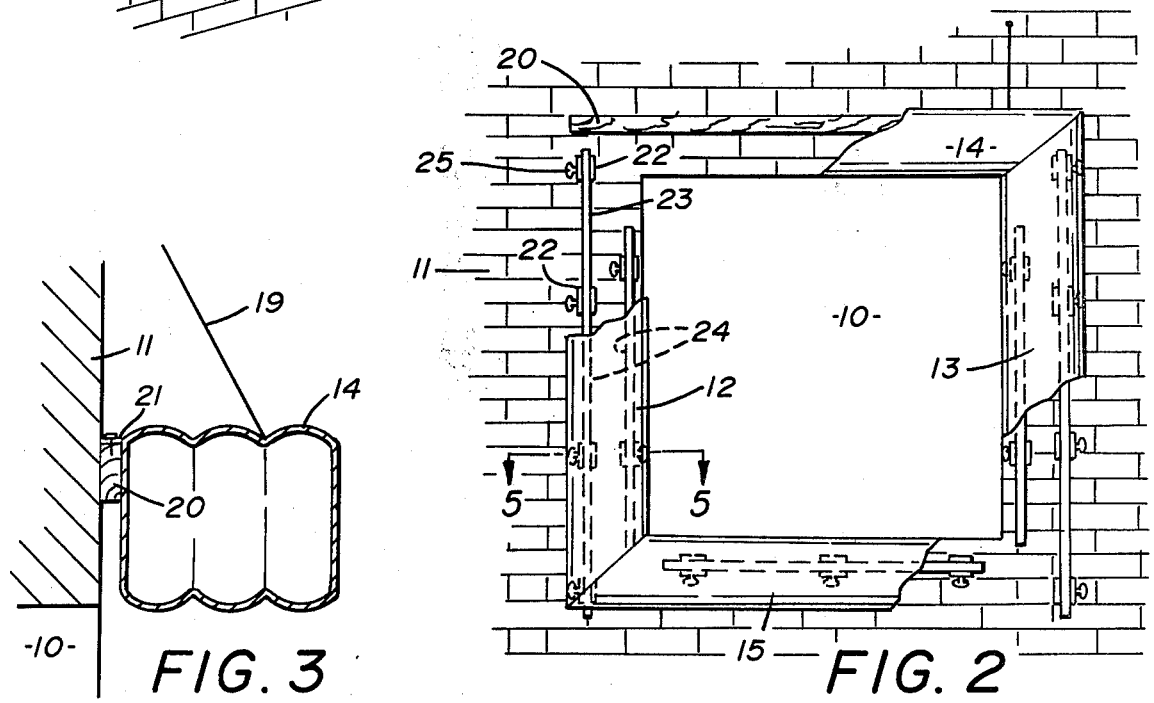
FIG. 2 is a plan view of the inflatable dock seal with parts of the inflatable portions broken away to show the mounting devices on the supporting wall.
Figure 4:
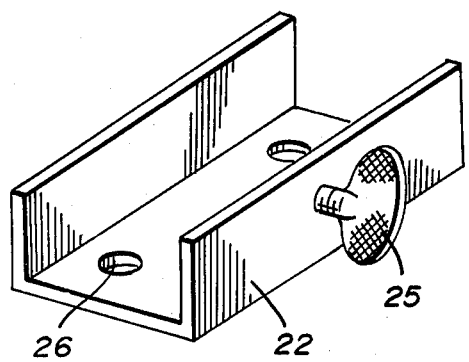
FIG. 4 is an enlarged detail perspective of one of the clamps used in the mounting devices in FIG. 2.

In FIG. 3 of the drawings an enlarged vertical section on line 3—3 of FIG. 1 illustrates the manner of the attachment of the upper horizontal section 14 of the inflatable dock seal to the wall 11 and in FIG. 2 of the drawings a portion of the member 20 is illustrated as are several of the C-shaped clamps 22, each of which has a set screw 25 therein and each of which as may be seen in the enlarged detail of FIG. 4 is provided with one or more apertures 26 through which fasteners such as screws may be positioned so as to secure the C-shaped clamp 22 to the wall 11.

In FIG. 2 of the drawings, the elongated rigid structural members 23 may be seen in broken lines positioned in the uninflated tubular members 24 attached to the side sections 12 and 13 and the bottom section 15 of the inflatable dock seal. Solid lines in FIG. 2 show these C-shaped clamps 22 and the elongated structural members 23 as they would appear if the flexible dock seal structure were removed as shown by the cutaway lines of FIG. 2.

Still referring to FIG. 2 it will be observed that there are two vertical rows of the C-shaped clamps 22 affixed to the face of the wall 11 in horizontally spaced relation so that elongated structural members 23 may be positioned along both the outer rear corners of the sections 12 and 13 of the inflatable dock seal and inwardly of the inner opposed surfaces thereof to insure the satisfactory retention of the vertical side sections 12 and 13 of the inflatable dock seal on the wall 11 and in relatively air tight relation to the surface thereof.

Figure 5:
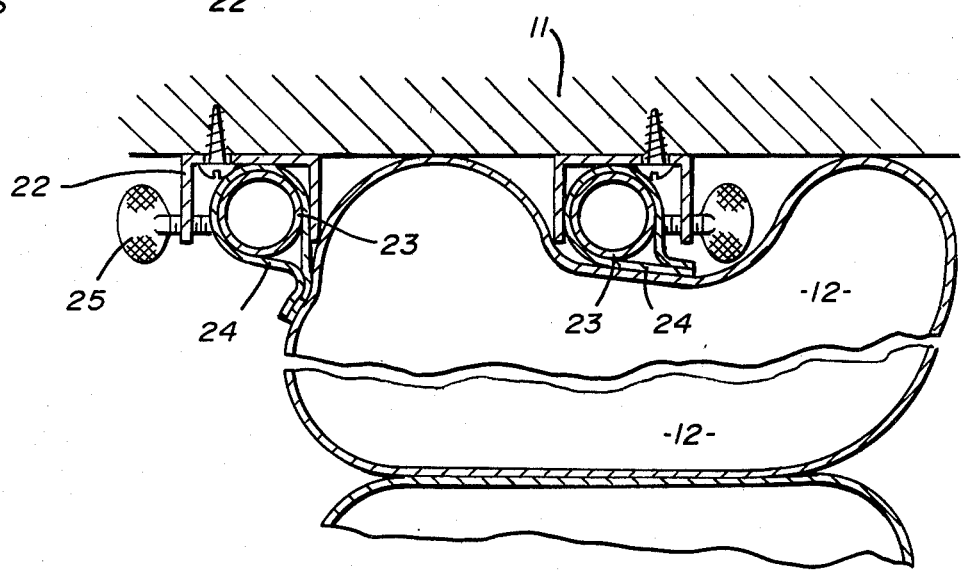
FIG. 5 is an enlarged horizontal section on line 5—5 of FIG. 1.
Figure 6:
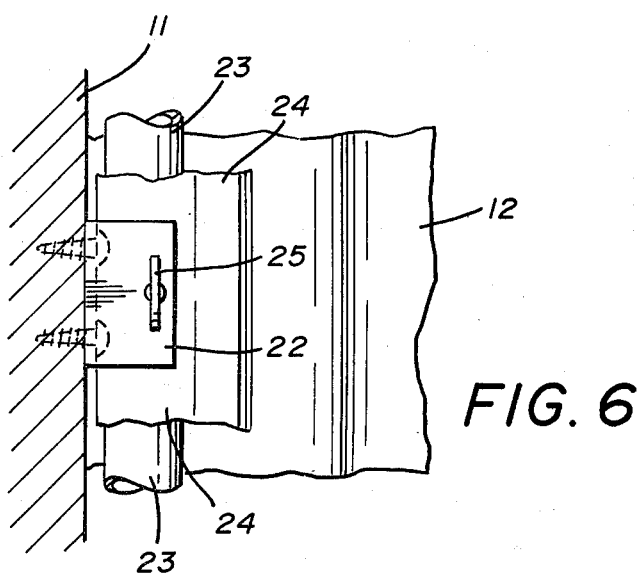
FIG. 6 is a side elevation of the detail of FIG. 5 with parts broken away.

In FIG. 5 of the drawings, a horizontal section on line 5—5 of both FIGS. 1 and 2 shows in enlarged detail the arrangement of the clamps 22 and their engagement with the elongated structural members 23 which are disposed in the uninflated tubes 24 which are attached to the side section 12 of the inflatable dock seal. Those skilled in the art will understand that duplicate constructions are formed on the side section 13 of the inflatable dock seal and by referring to FIG. 2 of the drawings again it will be seen that a horizontal arrangement of additional C-shaped clamps 22 and an additional elongated structural member 23 are positioned on the wall 11 below the dock opening 11 therein and secured to the horizontal section 15 of the inflatable dock seal by the positioning of the elongated structural member 23 in an uninflated tube 24 attached to the rear surface of the section 15 of the inflatable dock seal.

It will thus be seen that each of the vertical and horizontal sections of the inflatable dock seal disclosed herein are secured to the wall 11 and that the arrangement is such that the attachment of the dock seal at its sides and lower portion to the wall may be quickly and easily made and readily detached or reattached when needed.

It will also occur to those skilled in the art that the uninflated flexible tubes 24 which are preferably formed of the same flexible air impervious material as the dock seal itself can be continuous elongated sections open at their ends or they may comprise a plurality of relatively shorter sections arranged on a common axial line. In either event the elongated structural members 23 which may be pieces of lightweight metal tubing, can easily be positioned therein and the assembly clamped in the C-shaped clamps 22 by the manual manipulation of the set screws 25.

Although but one embodiment of the present invention has been illustrated and described, it will be apparent to those skilled in the art that various changes and modifications may be made therein without departing from the spirit of the invention and having thus described my invention.

What I claim is:

1. An inflatable dock seal and mounting therefor for positioning said dock seal on a wall about a dock opening therein and comprising at least one inflatable member arranged in a continuous semi-circular shape and having an upper horizontal section, a pair of spaced side sections and a lower horizontal section, flexible non-inflatable longitudinally positioned tubular fastening members on the exterior of at least one of said sections, rigid elongated structural members slidably positioned in said fastening members, a plurality of clamps comprising C-shaped devices having movable members extendible into the area of said C-shape and fasteners securing said clamps to said wall adjacent said dock opening and arranged for detachable engagement with said elongated structural members and means for inflating said inflatable members.

2. An inflatable dock seal and mounting therefor for positioning said dock seal on a wall about a dock opening therein and comprising at least one inflatable member arranged in a continuous semi-circular shape and having an upper horizontal section, a pair of spaced side sections and a lower horizontal section, flexible non-inflatable longitudinally positioned tubular fastening members on the exterior of at least one of said sections, rigid elongated structural members slidably positioned in said fastening members, a plurality of clamps attached to said wall adjacent said dock opening and arranged for detachable engagement with said elongated structural members and means for inflating said inflatable members, each of said clamps comprising a section of a channel having a flat base and right angular flanges with set screws threadably positioned in threaded openings in at least one of said right angular flanges.

* * * * *